United States Patent [19]

Bright

[11] Patent Number: 5,647,930
[45] Date of Patent: Jul. 15, 1997

[54] METHOD FOR FORMING A LAYERED PREFORM AND CONTAINER

[75] Inventor: Stephen A. Bright, Troy, Ohio

[73] Assignee: Electra Form, Inc., Vandalia, Ohio

[21] Appl. No.: 468,932

[22] Filed: Jun. 6, 1995

Related U.S. Application Data

[62] Division of Ser. No. 194,427, Feb. 10, 1994, Pat. No. 5,508,076.

[51] Int. Cl.[6] .................................................. B29C 65/06
[52] U.S. Cl. ...................... 156/73.5; 156/87; 156/245; 156/290; 156/293; 156/308.2; 264/248; 264/249; 264/250; 264/510; 264/512
[58] Field of Search .......................... 156/73.5, 87, 245, 156/278, 290, 293, 294, 308.2, 309.9, 322; 264/248, 249, 250, 513, 516, 510, 512; 215/12.1; 220/453, 454, 758, 767, 769, 775; 428/36.91, 542.8

[56] References Cited

U.S. PATENT DOCUMENTS

| | | | |
|---|---|---|---|
| 3,120,570 | 2/1964 | Kennedy et al. | 156/73.5 |
| 3,726,429 | 4/1973 | Doughty | 215/12.1 |
| 3,878,033 | 4/1975 | Zavasnik | 428/542.8 |
| 3,955,697 | 5/1976 | Valyi. | |
| 4,293,359 | 10/1981 | Jackobsen | 215/12.1 |
| 4,381,277 | 4/1983 | Nilsson. | |
| 4,391,861 | 7/1983 | Nilsson. | |
| 4,587,073 | 5/1986 | Jakobsen. | |
| 4,590,028 | 5/1986 | Rosenkranz et al.. | |
| 4,646,925 | 3/1987 | Nohara. | |
| 4,832,216 | 5/1989 | Reyes | 220/758 |
| 4,909,978 | 3/1990 | Hasegawa et al. | 264/516 |
| 4,927,679 | 5/1990 | Beck | 428/542.8 |
| 5,297,686 | 3/1994 | Takeuchi | 220/769 |
| 5,366,774 | 11/1994 | Pinto et al. | 428/542.8 |

FOREIGN PATENT DOCUMENTS

| | | |
|---|---|---|
| 1560952 | 12/1976 | United Kingdom. |
| 2061800 | 5/1981 | United Kingdom. |

OTHER PUBLICATIONS

Research disclosure, Dr. R.L. Addleman, published Mar., 1977.

*Primary Examiner*—Michael W. Ball
*Assistant Examiner*—Richard Crispino
*Attorney, Agent, or Firm*—Locke Reynolds

[57] ABSTRACT

A preform for use in the production of a container in a blow-molding operation includes an inner parison molded in a first mold to include a finish portion including a mouth-defining opening, a threaded outer surface adapted to engage a container closure, and a lower margin including a support ring, a closed bottom portion including a gate vestige, and a barrel portion extending between the finish portion lower margin and the bottom portion, and an outer parison molded in a second mold and consisting essentially of a barrel portion having a length similar to the inner parison barrel portion and a bottom portion including an opening for receiving the inner parison gate vestige, the outer parison having an inner surface conformably matching the inner parison outer surface. The outer parison is mechanically telescopically assembled over the inner parison outside the first and second molds to form a layered preform, the preform optionally including an intermediate layer. The layered preform can also include a handle including a ring portion having an inner diameter similar to the inner parison barrel portion outer diameter, and a gripping portion projecting outward from the ring portion, the handle ring portion being positioned between the outer parison barrel portion and the inner parison finish portion.

4 Claims, 4 Drawing Sheets

METHOD FOR FORMING A LAYERED PREFORM AND CONTAINER

This is a Divisional application of U.S. patent application Ser. No. 08/194,427, filed Feb. 10, 1994, now U.S. Pat. No. 5,508,076.

BACKGROUND OF THE INVENTION

The present invention relates generally to preforms for use in blow molding containers formed of polymeric resins. The invention particularly relates to such preforms having more than one layer of resin.

Preforms having more than one layer of resin material have been used in blow molding operations to form containers having multi-layered walls. The layered preforms can be formed by co-extrusion or co-injection of multiple polymer streams of resin into a single mold. Such co-injection processes are sometimes difficult to control and are subject to layer thickness variation as a result of variations in control parameters. A series of injection processes has also been employed to form a layered preform in a series of molds, the preform being transferred from mold to mold in the process of adding each new layer. The thickness build up of the preform using such a process translates into longer cooling times since cooling of the newly injected layer of plastic can only be achieved through contact of one side of the layer of resin. Any of these processes can be used to form a layered preform in which recycled resin forms an outside layer of the preform while virgin resin forms an inside layer of the preform, the inside layer forming the portion of the container most likely to experience contact with foods, beverages, drugs, cosmetics or the like within the container. For the purposes of this invention, all resin not suitable for food contact under part 177 of title 21 of the United States Code of Federal Regulations is considered as the equivalent to recycled resin.

It has also been suggested to independently mold two or more layers in separate molds and to thereafter form a preform by assembling a series of layers together. This method has the advantages of direct control of each layer of thickness since it is formed in a separate mold specifically fashioned for that layer where thickness tolerances can be carefully controlled. The process is also advantageous in that each layer is very thin and subject to cooling from both sides and therefore the production of each layer can be comparatively rapid. Since the layers can be simultaneously formed in separate molds, this formation time, even when added to the assembly time, can yield faster production for a preform over that experienced for molding a single or multiple layer preform in a single fixed mold. However, the subsequent handling of such an assembled preform has, on occasion, proved difficult as the assembled layers of the preform have a tendency to de-laminate, partially or entirely, prior to the blowing operation.

SUMMARY OF THE INVENTION

In accordance with the present invention, a layered preform for use in the production of a plastic container in a blow molding operation comprises an inner parison molded in a first mold to include a finish portion having a lower margin, a closed bottom portion, and a barrel portion extending between the finish portion and the bottom portion. An outer parison is molded in a second mold and consists essentially of a barrel portion having a length similar to the inner parison barrel portion and a bottom portion including an opening. The outer parison is molded to have an inner surface which conforms generally to the shape of the inner parison outer surface. The outer parison is mechanically assembled over the inner parison outside the first and second molds and retaining means are provided for retaining the parisons in fixed position relative to each other to form the layered preform.

The retaining means can be formed at the juncture of the lower margin of the finish portion of the inner parison and the upper margin of the outer parison by thermally welding the two margins together through local induction heating, laser heating, or spin-welding. In another embodiment, the closed bottom portion of the inner parison includes a gate vestige while the opening in the outer parison bottom portion is specifically sized to receive the gate vestige on the inner parison, the retaining means comprising a thermally welded portion of the gate vestige to the margin of the outer parison bottom opening.

Once the retaining means is formed thus assuring no movement between the inner and outer parisons, the layered preform can be heated to blow-molding temperature. For polyethylene terephthalate and many other resins, the blow-molding temperature is sufficiently near the glass transition temperature that the confronting surfaces of the two layers become tacky and, if made of a sufficiently common resin material, adhere to one another.

In another embodiment, the layered preform further comprises a handle formed in a separate mold to include a ring portion having an inner diameter similar to the inner parison barrel portion outer diameter. A gripping portion of the handle projects outward from the ring portion. The ring portion is positioned between the outer parison barrel portion and the inner parison finish portion. In the subsequent heating of the layered preform prior to blow-molding, care must be taken to prevent the gripping portion of the handle from deforming unacceptably. In the subsequent blow-molding operation, the handle can be positioned in pockets provided in the parting plane of the blow mold.

In still another embodiment, the layered parison further comprises at least one additional layer of material sandwiched between the inner parison and the outer parison. The at least one additional layer of material preferably contributes additional properties to the container and can comprise a gas barrier layer consisting essentially of a resin material having a gas permeability less than either resin forming the inner parison or the outer parison. The suitability of the resin material forming the additional layer or layers depends on the properties of the resins selected to form the inner and outer parisons and desired performance criteria generally known in the art, for example, as disclosed in U.S. Pat. Nos. 4,482,586; 4,501,781; 4,574,148; 4,919,984; 4,959,421; and 5,077,111.

Other features of the present invention and their inherent advantages will become apparent to those skilled in the art upon considering the following description of preferred embodiments which refers to the accompanying drawings.

Figure 1:
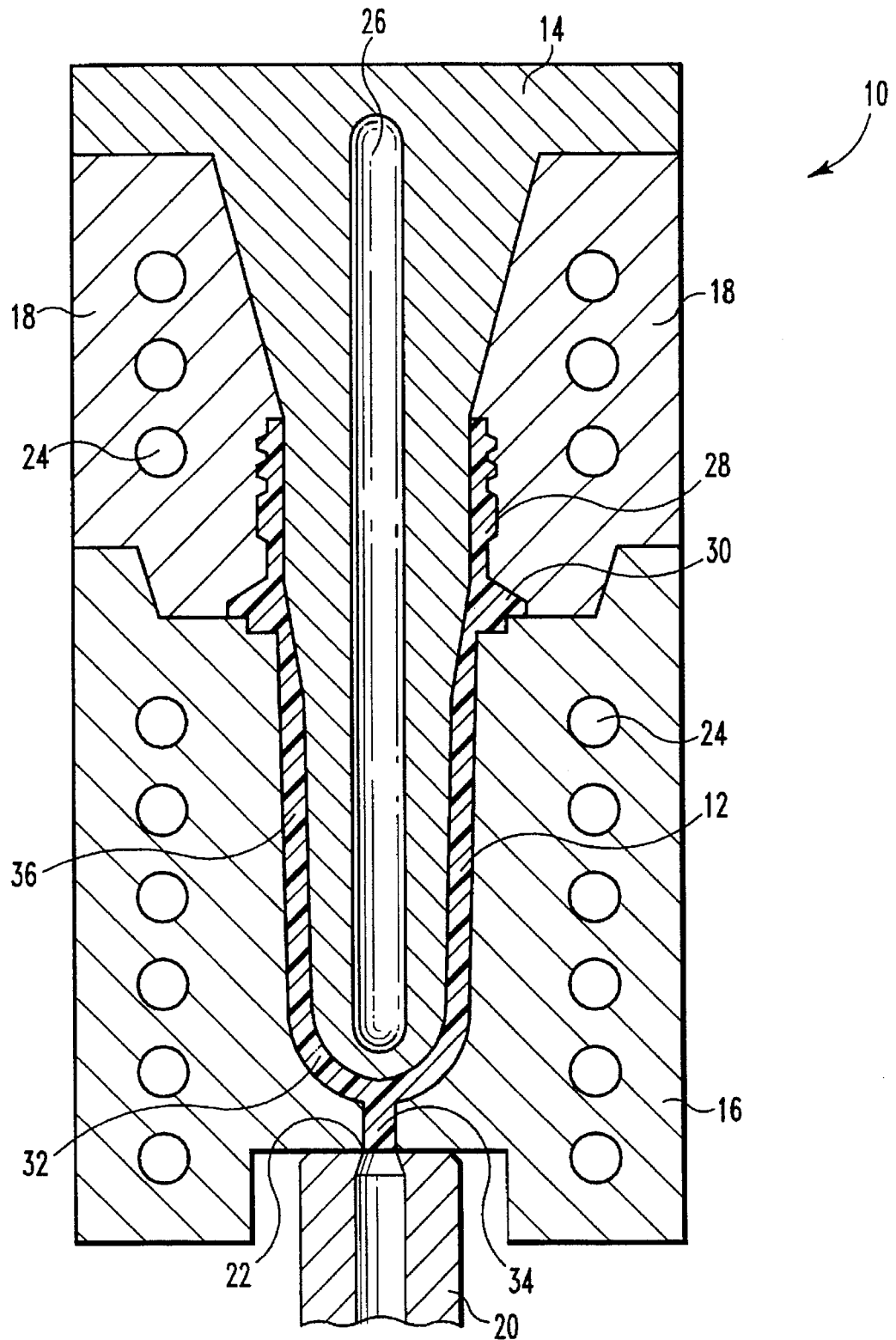
FIG. 1 is a sectional view of a mold in which an inner parison, according to the present invention, is molded.

The thickness of the materials forming each layer of the layered preform have been exaggerated in the figures for clarity.

DESCRIPTION OF THE PREFERRED EMBODIMENT

A mold 10 for forming an inner parison 12 in accordance with the present invention is shown to include a core member 14, a cavity member 16 and a thread split 18. The core member 14, cavity member 16 and thread split 18 are shown together in the closed position suitable to receive molten plastic under pressure from injection head 20 through gate 22 into the cavity forming the parison 12. Various cooling channels 24 including fountain 26 within the core 14 are provided for cooling the plastic forming parison 12. The inner parison 12 is shown to include a finish portion 28 including support ring 30 formed between the thread split 18 and the core 14. The inner parison 12 also includes a closed bottom portion 32, a gate vestige 34 extending downwardly from the closed bottom portion 32 and a barrel portion 36 extending between the bottom portion 32 and a lower margin of the finish portion 28. The closed bottom portion 32 and barrel portion 36 of inner parison 12 are formed between the core 14 and the cavity 16. The gate vestige 34 is formed between the bottom portion 32 of parison 12 and gate 22 within cavity 16.

Figure 2:
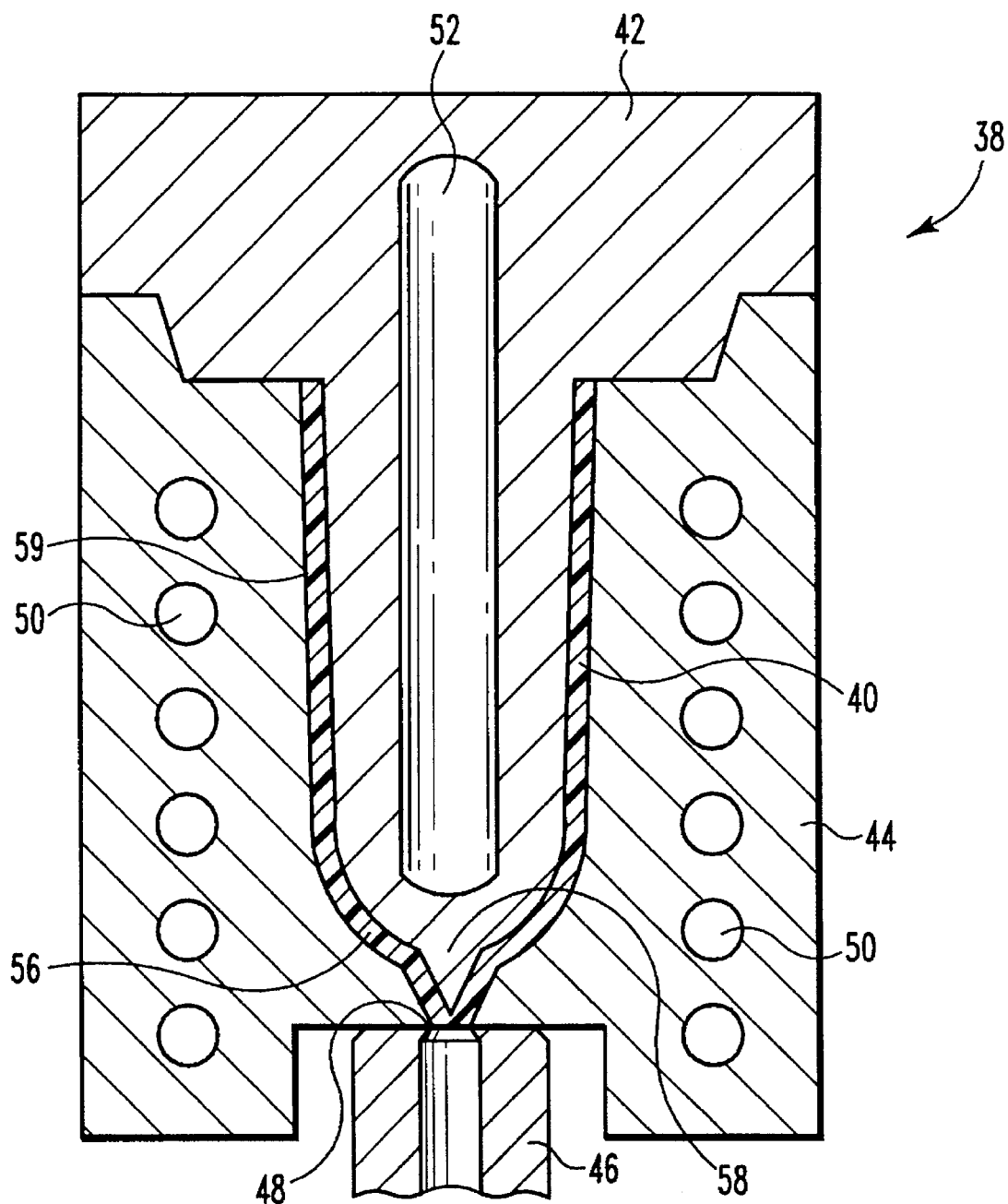
FIG. 2 is a sectional view of a mold in which an outer parison, according to the present invention, is molded.

A second mold 38, shown in FIG. 2, is used to form an outer parison 40 according to the present invention. The mold 38 includes a core 42 which cooperates with cavity 44 to define the space into which molten plastic is injected from injection head 46 through a specially configured ring gate 48 into the space between the core 42 and cavity 44. Again, cooling channels 50, including fountain 52, are provided for cooling the plastic to form the outer parison 40. The outer parison 40 is shown to have a barrel portion 54 and a bottom portion 56, the bottom portion 56 including a central opening 58 defined by the ring gate 48.

Figure 3:
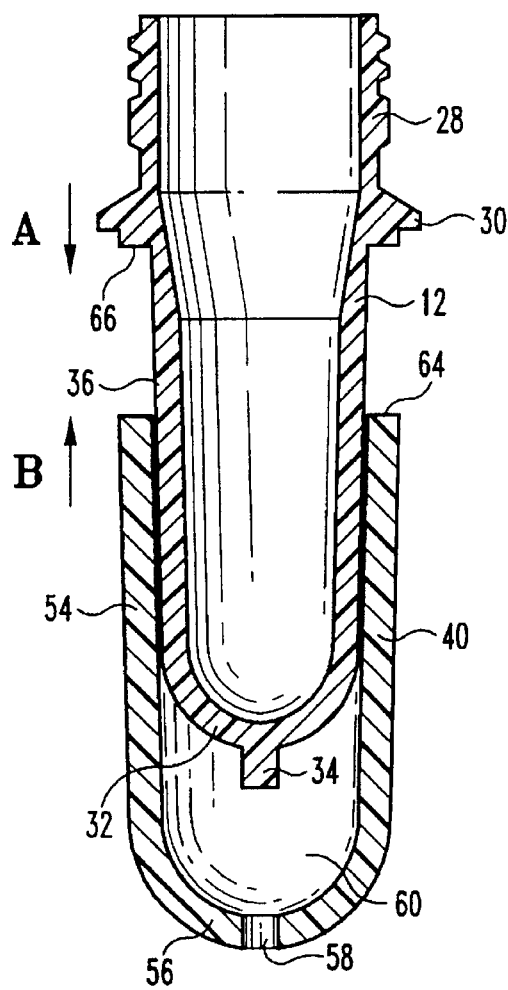
FIG. 3 is a sectional view showing the mechanically assembly of an inner and outer parison according to the present invention.

After the inner parison 12 and the outer parison 40 have been molded in molds 10 and 38, respectively, they are removed from the molds and telescopically assembled as shown in FIG. 3 by coaxially moving the inner parison 12 and outer parison 40 in the direction of arrows A and B, respectively, until the upper margin 64 of parison 40 contacts the lower margin 66 of parison 12. The hole 58 in the bottom of outer parison 40 permits air to exit from the space 60 between the two parisons as they are telescopically assembled. The hole 58 in the bottom of outer parison is sized to receive the gate vestige 34 protruding downward from the bottom 32 of inner parison 12.

Figure 4:
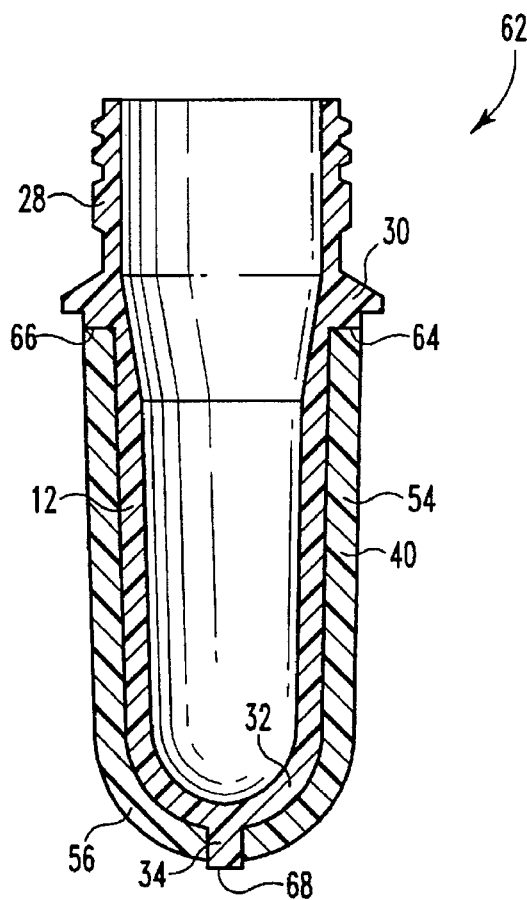
FIG. 4 is a sectional view of a layered preform constructed from the assembly shown in FIG. 3.

Upon completion of the coaxial movement of the inner parison 12 and outer parison 40, the two parisons form a layered preform 62 as shown in FIG. 4. Once assembled, the inner parison 12 and outer parison 40 are retained together in fixed position relative to each other by a retaining means which can take several forms.

In a first form of the retaining means, the inner parison 12 and outer parison 40 are rotated quickly with respect to each other for a time sufficient to spin-weld the upper margin 64 of the barrel portion 54 of outer parison 40 to the lower margin 66 of the support ring 30. The spin-weld formed retaining means of the layered preform is situated in a region where, upon subsequent blowing of the preform in a blow mold, the region undergoes negligible expansion. A similar retaining means can be formed at the same location by localized induction heating of the margins 64 and 66, by laser welding of one or more points of the margins 64 and 66, or by other methods apparent to those skilled in the art.

An alternative retaining means can be formed by thermally welding a protruding portion 68 of the gate vestige 34 to the hole 58 at the bottom of the outer parison 40. The thermal weld can be formed by direct contact of the protruding portion 68 with a source of heat sufficient to plastically deform the protruding portion outwardly to extend over and/or bond with a lower margin of hole 58. The means for forming the thermal weld at the bottom of the outer parison 40 can include laser spot welding, and other methods apparent to those skilled in the art.

In yet another embodiment of the retaining means, the outer parison 40 is assembled onto the inner parison 20 under conditions wherein the outer parison is significantly hotter than the inner parison and wherein the inside diameter of the outer parison 40 is dimensioned relative to the outside diameter of inner parison 12 such that through thermal contraction upon arriving at the same temperature no dimensional difference exists between the two parisons thereby insuring significant frictional engagement over the entire length of the mating surfaces of the barrel portions of the two parisons. When this thermal contraction retaining means is employed, special care may have to be employed in the reheating of the layered perform prior to blowing the container to insure uniform heating of both the inner and outer parison simultaneously so that no dimensional differences arise which would reduce the frictional engagement between the two parisons until both parisons are sufficiently near the glass transition temperature that the confronting surfaces adhere to one another.

Figure 5:
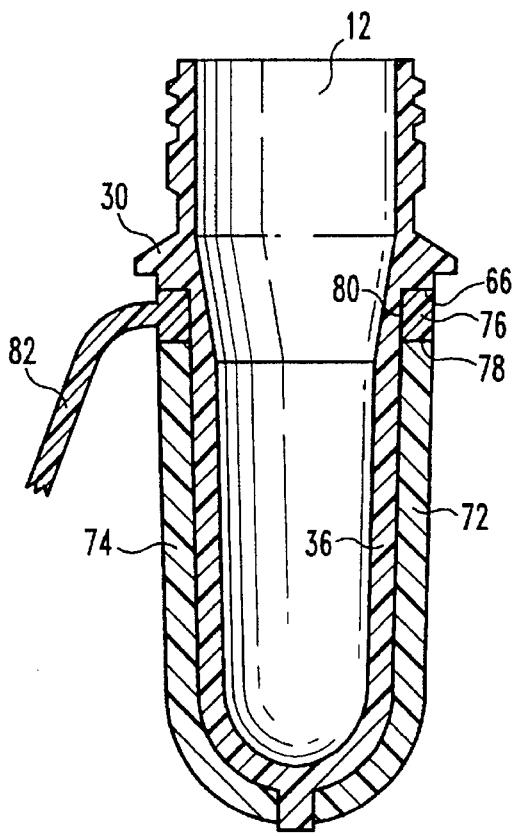
FIG. 5 is a sectional view of a layered preform in accordance with the present invention including a handle.

Another layered preform 70, according to the present invention, is shown in FIG. 5 to comprise an inner parison 12 substantially as previously described in the preceding figures. The layered preform 70 further comprises an outer parison 72 similar to parison 40 of the previous figures, but with a barrel portion 74 slightly shorter in length than barrel portion 54 of outer parison 40. A ring-shaped member 76 is situated between the lower margin 66 of parison 12 and an upper margin 78 of outer parison 72. An inner surface 80 of the ring member 76 contacts the outer surface of barrel portion 36 of inner parison 12. A handle 82 or other similar appendage protrudes radially outward from the ring member 76 to provide for easy handling of the container to be formed from the preform 70. The ring member 76 is situated in the location shown in FIG. 5 by assembling the ring member 76 onto the inner parison 12 prior to or during the assembly of the outer parison 72 onto the inner parison 12 in a manner similar to that shown in FIG. 3. The retaining means retaining the inner and outer parisons in fixed position relative to each other also retains the ring member 76 and integral appendage 82 at the desired location. In the subsequent heating of the layered preform prior to blow-molding it into a container, care must be taken to prevent the gripping portion of the handle 82 from deforming unacceptably. In the subsequent blow-molding operation, the handle 82 is preferably positioned in pockets provided in the parting plane of the blow mold. The shape of the handle 82 is variable depending on the nature and function of the container to be formed from the layer preform 70, the variation in shape being generally apparent to those skilled in the art of plastic bottle making.

Figure 6:
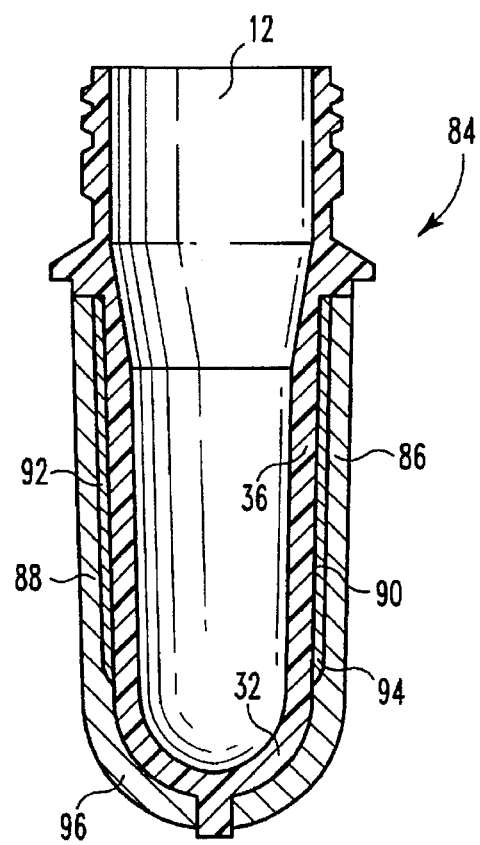
FIG. 6 is a sectional view of a layered preform in accordance with the present invention including an additional layer of material sandwiched between the inner and outer parisons.

Layered preform 84, shown in FIG. 6, is yet another embodiment of the present invention. The preform 84 is formed from an inner parison 12, as previously described, an outer parison 86 having an inner diameter of at least the length of the barrel portion 88 which is slightly larger than the outer diameter of the barrel portion 36 of inner parison 12 thereby defining a space 90 for receiving at least one additional layer of material 92 which is sandwiched between the inner parison 12 and the outer parison 86. As illustrated, the inner surface of the outer parison 86 includes a step 94 at the lower margin of the region defining space 90. Below the step 94, the outer surface of the bottom portion 32 of inner parison 12 and the inner surface of bottom portion 96 of outer parison 86 are in physical contact. Preferably the position of the lower step 94 is designed such that when the layered preform 84 is subsequently blow molded into a container, the additional layer of material 92 is situated in the side wall of the container while the bottom portions 32 and 96 of the parisons are situated in the bottom of the container. The additional layer of material 92 can be formed by extruding a tubular sleeve of coating material, and slipping the sleeve of coating material over the barrel portion 36 of the inner parison 12 prior to the mechanical assembling of the inner and outer parisons 12 and 86.

This feature is particularly advantageous when the at least one additional layer of material 90 is a gas barrier layer formed of a resin having a gas permeability less than either of the resins forming the inner and outer parisons 12 and 86, respectively, since the predominant location for gas migration is through the side wall of a blow molded container while only a small portion of gas migrates through the bottom of the container which is generally physically thicker. The preferred resin material for forming a gas barrier layer is a mixture of a very small proportion of a resin having low oxygen permeability such as nylon with a large proportion of a resin matching the chemistry of the inner and outer parisons.

Although the invention has been described in detail with reference to certain illustrated preferred embodiments, variations and applications exist within the scope and spirit of the invention as described in the following claims.

What is claimed is:

1. A method for forming a layered preform for use in the production of a container in a blow-molding operation, the preform forming method comprising the steps of:

molding in a first mold an inner parison comprising a finish portion having a lower margin, a closed bottom portion including a gate vestige, and a barrel portion extending between the finish portion lower margin and the bottom portion, molding in a second mold an outer parison consisting essentially of a barrel portion having a length slightly less than the inner parison barrel portion and a bottom portion having an opening therein, the outer parison having an inner surface conformably matching the inner parison outer surface, molding in a separate mold a handle including a ring portion having an inner diameter similar to the inner parison barrel portion outer diameter and a gripping portion projecting outward from the ring portion, mechanically assembling the outer parison telescopically over the inner parison outside the first and second molds, positioning the ring portion of the handle between the outer parison barrel portion and the inner parison finish portion, the opening in the outer parison bottom portion receiving the gate vestige on the inner parison, and retaining the parisons in fixed position relative to each other to form a layered preform.

2. A method for forming a layered preform for use in the production of a container in a blow-molding operation, the preform forming method comprising the steps of:

molding in a first mold an inner parison comprising a finish portion having a lower margin, a closed bottom portion including a gate vestige, and a barrel portion extending between the finish portion lower margin and the bottom portion, molding in a second mold an outer parison consisting essentially of a barrel portion having a length similar to the inner parison barrel portion and a bottom portion having an opening therein, the outer parison having an inner surface conformably matching the inner parison outer surface, mechanically assembling the outer parison telescopically over the inner parison outside the first and second molds, the opening in the outer parison bottom portion receiving the gate vestige on the inner parison, and retaining the parisons in fixed position relative to each other to form a layered preform including quickly rotating the parisons with respect to each other for a time sufficient to spin-weld an upper margin of the barrel portion of the outer parison to the lower margin of the finish portion of the inner parison.

3. A method for forming a container having a handle comprising the steps of:

molding in a first mold an inner parison comprising a finish portion having a lower margin, a closed bottom portion including a gate vestige, and a barrel portion extending between the finish portion lower margin and the bottom portion, molding in a second mold an outer parison consisting essentially of a barrel portion having a length slightly less than the inner parison barrel portion and a bottom portion having an opening therein, the outer parison having an inner surface conformably matching the inner parison outer surface, molding in a third mold a handle including a ring portion having an inner diameter similar to the inner parison barrel portion outer diameter and a gripping portion projecting outward from the ring portion, slipping the ring portion of the handle over the inner parison barrel portion until an upper margin of the ring portion abuts the inner parison finish portion lower margin, mechanically assembling the outer parison over the inner parison outside the first and second molds to form a layered preform, the opening in the outer parison bottom portion receiving the gate vestige on the inner parison, heating a first portion of the layered preform to a temperature suitable to weld the parisons together to permit further handling of the layered preform and a unit, heating the barrel and bottom portions of the layered preform to a temperature suitable for conducting of a blow-molding operation, inserting the heated layered preform in a blow-mold having a pocket for receiving the gripping portion of the handle in the parting plane of the blow mold, and blow-molding the heated layered preform into a container.

4. The method of claim 3 wherein the slipping and the mechanically assembling steps are performed simultaneously.

* * * * *